C. WRIGHT AND J. W. AWALD.
GAS SAVER FOR ENRICHING HEATING AND ILLUMINATING GAS.
APPLICATION FILED JAN. 8, 1918.

1,319,316.

Patented Oct. 21, 1919.
2 SHEETS—SHEET 1.

C. WRIGHT AND J. W. AWALD.
GAS SAVER FOR ENRICHING HEATING AND ILLUMINATING GAS.
APPLICATION FILED JAN. 8, 1918.

1,319,316.

Patented Oct. 21, 1919.
2 SHEETS—SHEET 2.

Inventors-
Carey Wright,
by J. W. Awald.
E. W. Anderson Son
Attys.

UNITED STATES PATENT OFFICE.

CAREY WRIGHT, OF DUNKIRK, AND JOHN WILSON AWALD, OF FREDONIA, NEW YORK.

GAS-SAVER FOR ENRICHING HEATING AND ILLUMINATING GAS.

1,319,316.      Specification of Letters Patent.      Patented Oct. 21, 1919.

Application filed January 8, 1918. Serial No. 210,911.

*To all whom it may concern:*

Be it known that we, CAREY WRIGHT and JOHN W. AWALD, citizens of the United States, resident, respectively, of Dunkirk and Fredonia, in the county of Chautauqua and State of New York, have made a certain new and useful Invention in Gas-Saver for Enriching Heating and Illuminating Gas; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
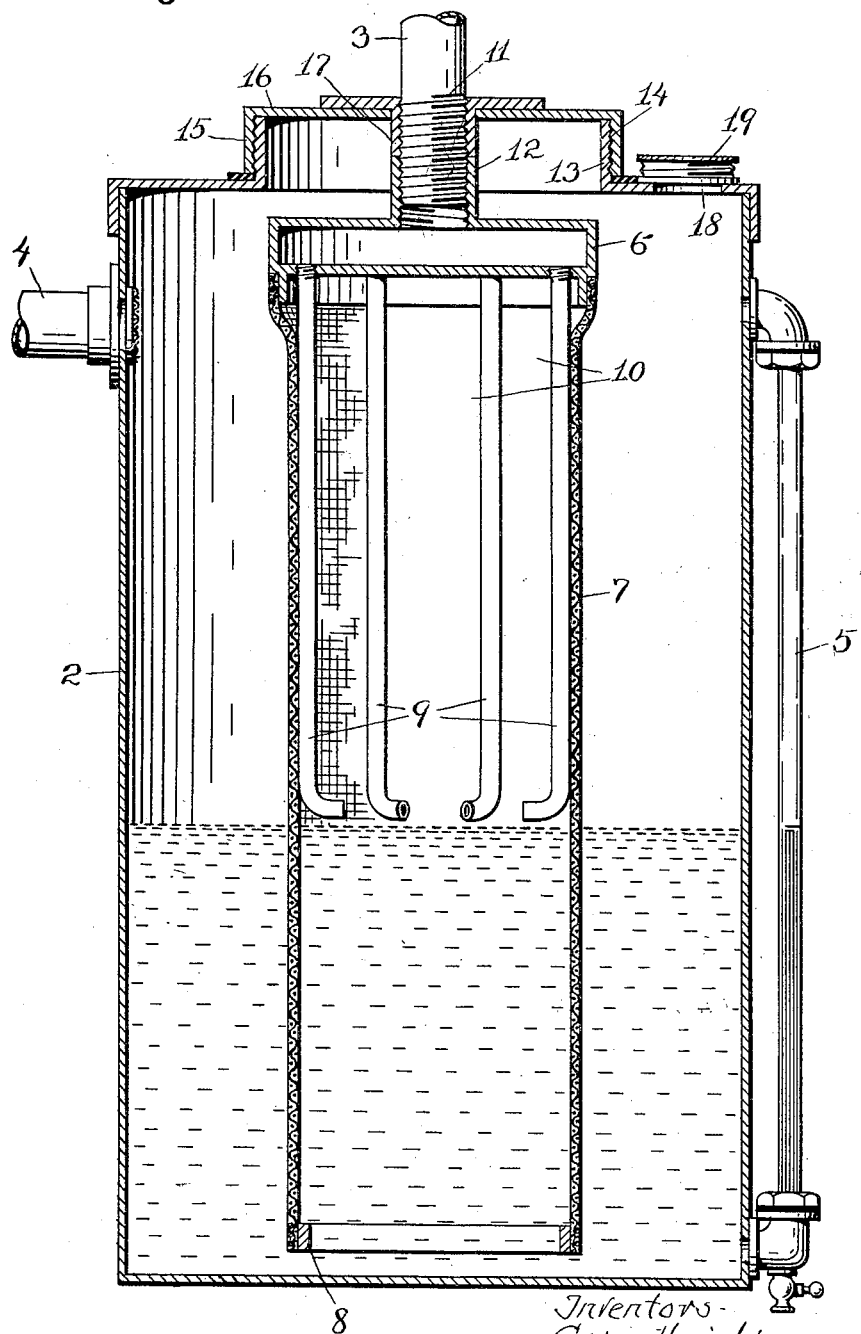
Figure 1 is a longitudinal vertical section of the invention taken centrally thereof.
Figure 2:
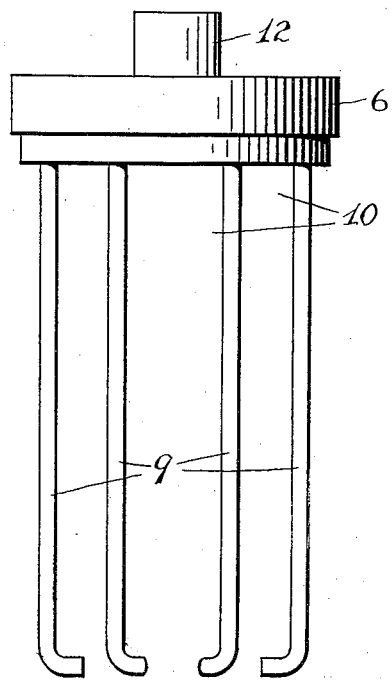
Fig. 2 is a detail side view of the gas receiving chamber and the distributing pipes.
Figure 3:
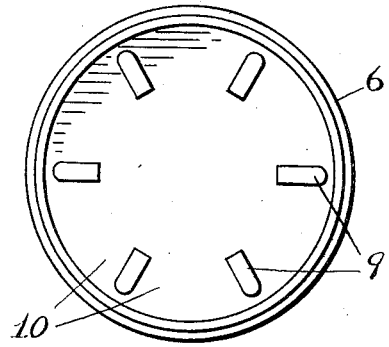
Fig. 3 is a bottom plan view of the same.

The invention has relation to means for enriching heating and illluminating gas supplied to residences, factories and other places, said supply being either natural, manufactured or producer gas, and low in carbon constituents, the object being to render the gas more efficient for either heating or illuminating, whereby less gas is required for a given heating or illuminating effect, thereby saving gas.

The invention consists in the novel construction and combination of parts, as hereinafter set forth.

In the accompanying drawings, illustrating the preferred embodiment of the invention, the numeral 2 designates an outer hollow casing or tank, designed to contain a supply of enriching fluid, as gasolene or other fuel oil or liquid, said tank provided with a suitable inlet pipe 3 from the gas supply, an outlet pipe 4 to the burners, and a gage glass 5, to show the height of the fluid therein.

Located centrally of the tank is an upper gas receiving chamber 6, carrying a tubular depending wick 7, the latter extending at its lower portion or submerged within the fluid of the tank and having a lower annular weight 8, serving to hold the wick stretched to full length and to spread the lower portion thereof.

Depending from the bottom of the receiving chamber are an annular series of vertical distributing tubes 9, the lower ends of which terminate above the level of the fluid in the tank and are inturned radially or toward the center of the tubular wick, said pipes located at the inner surface of and serving to spread the upper portion of the wick and spaced apart by intervals 10.

Usually the tank supply pipe will be threaded at 11, for engagement with an upper tubular threaded extension 12 of the receiving chamber 6, the top of the tank having an upper tubular extension 13, externally threaded at 14 and engaging the internal thread of a depending flange 15 of a supporting member or disk 16, the latter forming the center of the top of the tank and supported in turn from the supply pipe 3 through the medium of a tubular collar 17, internally threaded and engaging the thread of said pipe. A filling opening for the tank is shown at 18 and is provided with a suitable cap or cover 19.

In the use of this invention, gas supplied through the pipe 3 will enter the receiving chamber 6 and spread therein, being distributed downwardly through the small pipes 9, the streams or currents of gas issuing from the lower inturned ends of the distributing pipes within the tubular upper portion of the wick, forming a distributing chamber. These streams of gas will converge and rise centrally of the wick or distributing chamber, being distributed to all parts of said chamber and passing outwardly through the wick, within the intervals 10 between the depending pipes, the gas being thereby enriched or taking up in vapor form the fuel oil or liquid with which the wick is saturated through capillary action.

The gas so enriched, issuing from all sides of the tubular upper portion of the wick, within the upper part of the tank located around the wick and forming a delivery chamber, will pass from the latter chamber through the outlet pipe 4, as aforesaid, to the burners.

Figure 4:
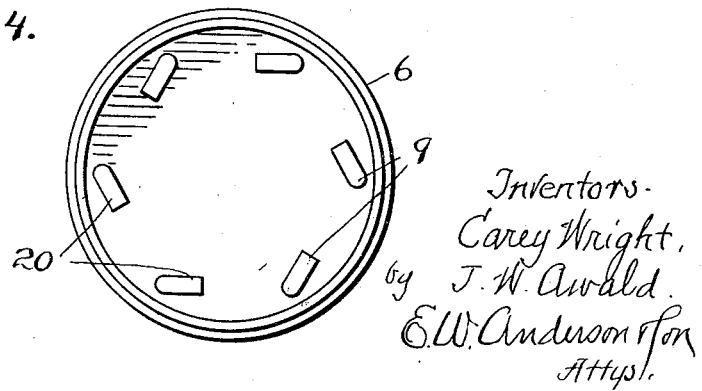
Fig. 4 is a similar view showing a modification.

If desired, the lower ends of the annular series of distributing and wick spreading pipes may be turned at 20, circumferentially, all in the same direction, as shown in Fig. 4 of the drawings, to cause a spiral current or whirl of the gas within the wick chamber.

We claim:

In means for enriching gas, a liquid containing tank, a gas-receiving chambered casing located centrally of the upper portion of said tank, a single large tubular wick secured at its upper end circumferentially to and depending from said casing and submerged at its lower portion in the liquid of said tank, a series of gas distributing tubes connected at their upper ends to the outer marginal portion of and depending from said casing, said tubes located within and contacting at their outer edges with the inner circumferential surface of and serving to spread said wick and being adapted to discharge at their lower ends adjacent to the liquid in said tank.

In testimony whereof we affix our signatures in presence of two witnesses.

CAREY WRIGHT.
JOHN WILSON AWALD.

Witnesses:
 JOHN C. HAAS,
 JOHN O. CRIPE.

Copies of this patent may be obtained for five cents each, by addressing the "Commissioner of Patents, Washington, D. C."